UNITED STATES PATENT OFFICE.

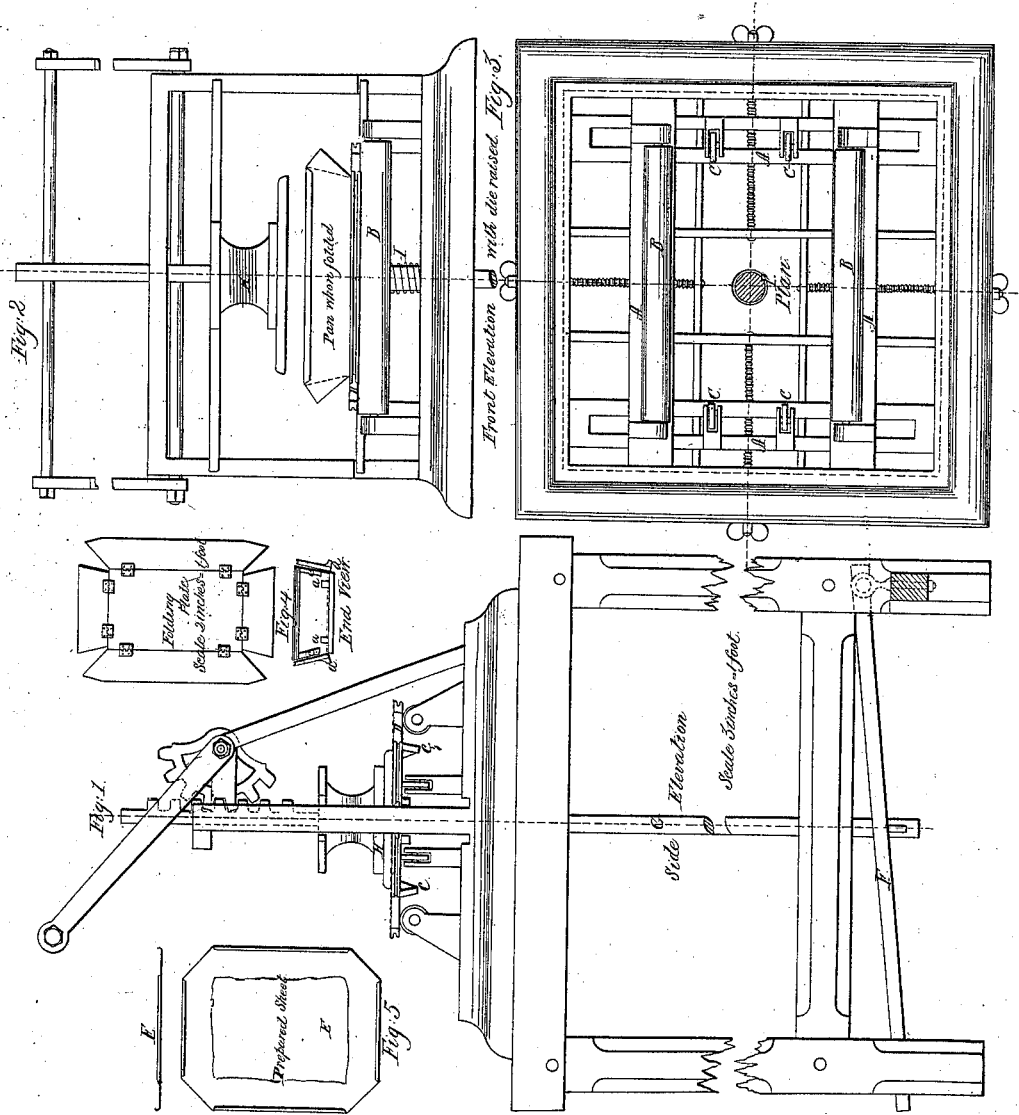

WILLIAM HAMILTON, OF PHILADELPHIA, PENNSYLVANIA.

IMPROVEMENT IN PAN-FOLDING MACHINES.

Specification forming part of Letters Patent No. 81,498, dated August 25, 1868.

*To all whom it may concern:*

Be it known that I, WILLIAM HAMILTON, of Philadelphia, in the State of Pennsylvania, have invented a new and Improved Mode of Folding Metallic Sheet Pans, Paper or Wood Boxes; and I do hereby declare that the following is a full and exact description thereof, reference being had to the accompanying drawings, and to the letters of reference marked thereon—

Figure 1 being a side elevation, Fig. 2 a front elevation, Fig. 3 a plan, Fig. 4 a folding-plate, and Fig. 5 a prepared metallic sheet.

The nature of my invention consists of providing my machine with a folding-plate with four (4) hinged sides, by means of which I am enabled to fold the sides and ends of a pan or box in one motion, also to form a metallic pan after the edge to receive the wire has been turned down, thereby increasing the speed of that branch of the work, as, before forming, the wire edge of the pan may be turned on any ordinary tinman's brake. The edge being turned, also acts as a stay to the pan, and prevents any warping in the process of folding or after the pan is taken from the machine. I also, by the combined action of my machine, leave the pan or box in a position to be quickly taken from the machine.

The folding of the metal being so gradual and uniform, I am enabled to use the cheapest quality without danger of cracking or tearing of the corners.

To enable others skilled in the art to make and use my invention, I will proceed to describe its construction and operation.

I construct my machine in any known form, and to it apply four (4) movable or sliding plates, as A A A A, Fig. 3, (which are moved at pleasure by means of set-screws on the outer edge of the machine,) to which are attached two (2) long rollers, as B B, Figs. 2 and 3, and four (4) short ones, as $c\ c\ c\ c$, Fig. 3, the latter capable of being moved from side to side, according to the size of the pan or box to be folded. On the top of said rollers is placed a folding-plate with four (4) hinged sides, as D D D, Figs. 1, 2, and 4.

On the edge of each side is a groove, by means of which the metallic sheet is held in position, as shown by dotted line, Fig. 1, in the following manner, viz: The sheet, after being cut in shape and size of pan required, and prepared by turning the edges for wire, as shown by E E, Fig. 5, by first contracting the edges of the folding-plate by means of pressure on treadle F, Fig. 1, (it being connected with the folding-plate by the rod G, Fig. 1, necessarily causes a depression of the plate, and consequently a contraction of the sides while in this position,) the prepared sheet is placed on, and the removal of the pressure from the treadle allows the spiral spring to force the folding-plate into its horizontal position, and its grooved edge into the corresponding edge on the metallic plate, in which position it is securely held. Then, by means of the lever, the die H H, Figs. 1 and 2, is forced down upon the sheet and folding-plate, whose sides being hinged, pass downward between the rollers, folding up the sides and ends of the pan at one motion, after which the pressure of the lever is removed and the spiral spring I, Figs. 2 and 3, forces up the hinged folding-plate, when the metal projections $a\ a\ a\ a$, Fig. 4, on the sides of the plates, in their upward course, strike the rollers, causing the folding-plate to revert into a horizontal position, leaving the pan entirely free.

The projections $c\ c\ c\ c$, Figs. 1 and 4, in the operation of folding, press the corners of the pan tightly together and inward, preparatory to being pressed down.

This machine may be constructed altogether, or in part, of wood or metal, and of any required dimensions.

My invention enables the operator to make any-sized pan required, (either straight or beveled sides, and from one-half inch to any required depth,) simply by changing the folding-plate D D D, Figs. 1, 2, and 4, the die H H, Figs. 1 and 2, and adjusting the rollers B B, Figs. 2 and 3, and $c\ c\ c\ c$, Fig. 3, to the required dimensions.

What I claim as my invention, and desire to secure by Letters Patent, is—

1. The hinged folding-plate, with grooved edges, or its equivalent, the metal projections on their sides and ends, or their equivalent, and the application of the rollers and movable slides, as substantially set forth herein, by the combined action of which the operator is enabled to fold a pan or box at one motion, and of any required form or size.

2. The prepared metallic sheet E E, Fig. 5, as described, and for the uses and purposes herein set forth.

WILLIAM HAMILTON.

Witnesses:
BRYAN O'BRIEN,
W. H. CARMAN.